United States Patent
Fujita et al.

[11] Patent Number: 5,792,343
[45] Date of Patent: Aug. 11, 1998

[54] BRINE SUPPLY SYSTEM

[75] Inventors: Masahiro Fujita, Toyoake; Koji Tsuchikawa; Yoshinori Kamitani, both of Nagoya, all of Japan

[73] Assignee: Hoshizaki Denki Kabushiki Kaisha, Aichi-ken, Japan

[21] Appl. No.: 710,154

[22] Filed: Sep. 12, 1996

[51] Int. Cl.$^6$ .................. B01D 17/12; C25B 5/02
[52] U.S. Cl. .................. 210/96.1; 137/101.25; 137/571; 204/229; 204/275; 210/105; 210/139; 210/243
[58] Field of Search .............. 137/87.01, 87.02, 137/571, 572, 101.25, 624.11; 210/96.1, 101, 104, 105, 130, 140, 138, 143, 190, 206, 243; 204/229, 232, 275; 422/28, 29; 417/12

[56] References Cited

U.S. PATENT DOCUMENTS

| | | | |
|---|---|---|---|
| 2,065,962 | 12/1936 | Bowers | 210/104 |
| 4,668,402 | 5/1987 | Norton | 210/140 |
| 5,234,563 | 8/1993 | Arai et al. | 204/229 |
| 5,510,009 | 4/1996 | Arai et al. | 204/229 |
| 5,589,058 | 12/1996 | Bauer | 210/140 |
| 5,624,535 | 4/1997 | Tsuchikawa et al. | 204/275 |

FOREIGN PATENT DOCUMENTS

| | | |
|---|---|---|
| 05161487 | 6/1993 | Japan. |
| 7-256080 | 9/1995 | Japan. |

*Primary Examiner*—Joseph W. Drodge
*Attorney, Agent, or Firm*—Hazel & Thomas

[57] ABSTRACT

A brine supply system including a first brine tank to store diluted brine of a predetermined concentration to be supplied into an electrolytic brine treatment device and a second brine tank to store an amount of saturated brine at a predetermined concentration. When the level of diluted brine becomes a lower limit level, the first brine tank is supplied with fresh water from an external supply source of water until the level of diluted brine becomes an upper limit level and is intermittently supplied with a predetermined amount of the saturated brine from the second brine tank. Based on a previously memorized supply time of the fresh water, a supply frequency and a supply interval of the saturated brine for the memorized supply time are calculated to maintain the diluted brine at the predetermined concentration even when the first brine tank is being supplied with the fresh water.

2 Claims, 4 Drawing Sheets

BRINE SUPPLY SYSTEM

BACKGROUND OF THE INVENTION

1. Field of the Invention

The present invention relates to a brine supply system for continuously supplying diluted brine of a predetermined concentration into a brine treatment device such as an electrolytic brine treatment device.

2. Description of the Prior Art

Disclosed in Japanese Patent Laid-open Publication No. 5(1993)-161487 is a brine supply system of this kind which includes a first brine tank arranged to store diluted brine of a predetermined concentration to be supplied into a brine treatment device such as an electrolytic brine treatment device and a second brine tank arranged to store saturated brine to be supplied into the first brine tank. In the brine supply system, the first brine tank is supplied with fresh water from an external supply source of water such as a city service water when it is detected by a water level sensor that the level of diluted brine in the first brine tank has dropped below a lower limit level due to supply of the diluted brine into the brine treatment device, and subsequently the first brine tank is supplied with saturated brine from the second brine tank until the concentration of diluted brine becomes the predetermined value.

In the brine supply system, however, the concentration of diluted brine in the first brine tank becomes lower than the predetermined value while it is being adjusted by supply of the fresh water and saturated brine. As a result, the concentration of diluted brine supplied into the brine treatment device may not be maintained at the predetermined value.

SUMMARY OF THE INVENTION

It is, therefore, a primary object of the present invention to provide a brine supply system wherein the concentration of diluted brine in the first brine tank is maintained at the predetermined value even when the first brine tank is being supplied with fresh water from the external supply source of water.

According to the present invention, the object is accomplished by providing a brine supply system for supplying diluted brine of a predetermined concentration into a brine treatment device which comprises a first brine tank arranged to store an amount of the diluted brine, first brine supply means for supplying a predetermined flow quantity of the diluted brine into the brine treatment device from the first brine tank in operation, water supply means for supplying fresh water into the first brine tank from an external supply source of water in operation, a second brine tank arranged to store an amount of saturated brine at a predetermined concentration, second brine supply means for intermittently supplying a predetermined amount of the saturated brine into the first brine tank from the second brine tank in each operation, and an electric control apparatus for controlling the water supply means in such a manner that the level of diluted brine in the first brine tank is maintained between upper and lower limit levels, wherein the electric control apparatus comprises a water level sensor for detecting the lower and upper limit levels of diluted brine in the first brine tank, first control means for operating the water supply means when it has been detected by the water level sensor that the level of diluted brine became the lower limit level and for maintaining the operation of the water supply means to supply fresh water into the first brine tank from the external supply source of water until the level of diluted brine becomes the upper limit level, memory means for measuring an operation time of the water supply means and for memorizing the measured operation time in each operation of the water supply means, calculation means for calculating an operation time interval of the second brine supply means on a basis of a previous operation time of the water supply means memorized in the memory means for maintaining the diluted brine in the first brine tank at the predetermined concentration, and second control means for operating the second brine supply means at the calculated operation interval in response to operation of the water supply means.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
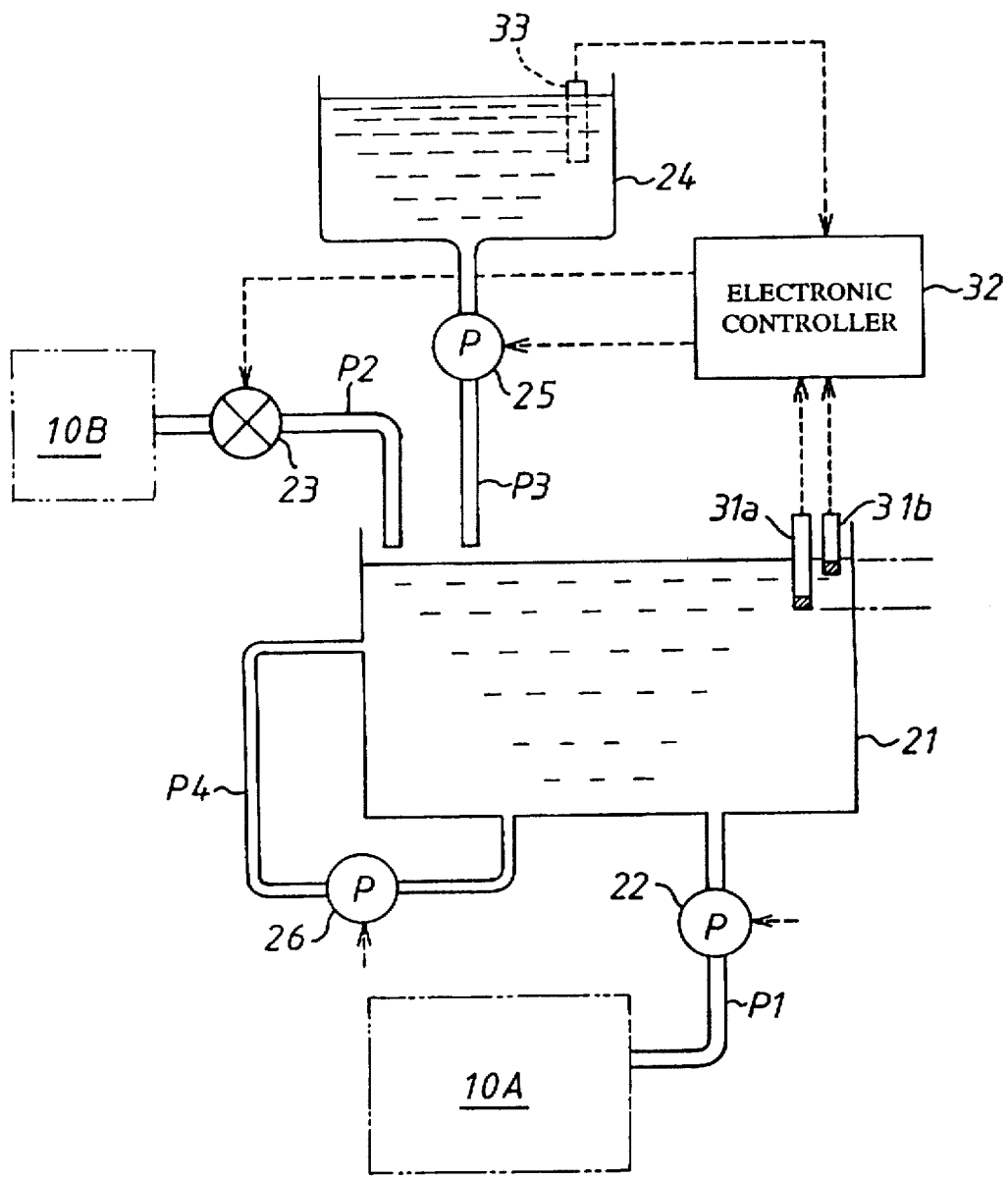
FIG. 1 is a schematic illustration of a brine supply system in accordance with the present invention.

In FIG. 1 of the drawings, there is schematically illustrated a preferred embodiment of a brine supply system for supplying diluted brine into a brine treatment device 10A in the form of an electrolytic brine treatment device. The brine supply system includes a first brine tank 21 arranged to store a predetermined amount (for instance, about 5 liters) of diluted brine of about 0.05% concentration. The first brine tank 21 is connected to the brine treatment device 10A through a brine supply conduit P1. An electrically operated hydraulic pump 22 is provided on the brine supply conduit P1 to supply a predetermined flow quantity (for instance, 2 liters per minute) of diluted brine into the brine treatment device 10A in operation. The brine treatment device 10A is composed of an electrolyzer for electrolyzing the diluted brine into acid ion water and alkaline ion water and a storage tank to store the acid and alkaline ion water. The acid ion water is utilized as sterilization water for medical treatment.

The first brine tank 21 is supplied with fresh water from an external supply source 10B of water through a water supply conduit P2. An electromagnetic water supply valve 23 of the normally closed type is provided on the water supply conduit P2 to control the amount of fresh water supplied into the first brine tank 21. The first brine tank 21 is also supplied with saturated brine from a second brine tank 24 through a brine supply conduit P3. An electrically operated hydraulic pump 25 is provided on the brine supply conduit P3 to supply the saturated brine into the first brine tank 21. The second brine tank 24 is arranged to store saturated brine of a predetermined concentration (for instance, about 10%) supplied therein. The hydraulic pump 25 is intermittently operated for a predetermined time to supply a predetermined amount (for instance, 0.106 milliliter) of saturated brine into the first brine tank 21 in each operation. A circulation conduit P4 is connected at opposite ends thereof with the first brine tank 21, and an electrically operated hydraulic pump 26 is provided on the conduit P4 to circulate the diluted brine in the first brine tank 21.

The brine supply system comprises an electric control apparatus for control of the hydraulic pumps 22, 25, 26 and the water supply valve 23. The electric control apparatus includes water level sensors 31a and 31b which are arranged to detect upper and lower limit levels of diluted brine in the first brine tank 21, respectively. These water level sensors 31a and 31b are connected to an electronic controller 32 in the form of a microcomputer which is programmed to repeat execution of a control program shown by a flow chart in FIG. 2 and to execute an interruption program shown by a flow chart in FIG. 3 at a predetermined time interval. The hydraulic pump 22 is activated by requirement of the electrolytic brine treatment device 10A, the electromagnetic water supply valve 23 and hydraulic pump 25 are operated under control of the controller 32, and the hydraulic pump 26 is operated constantly or at an appropriate time interval.

Hereinafter, operation of the brine supply system will be described with reference to the flow charts shown in FIGS. 2 and 3. Assuming that a power source switch (not shown) has been turned on at step 100 of FIG. 2 to initiate execution of the control program, the controller 32 sets a water supply time data Tw indicative of a supply time of fresh water into the first brine tank 21 from the external water supply source 10B as an initial value indicative of a standard water supply time T30 and repeats execution of processing at step 104–138. In this instance, if a final water supply time Tw in the previous operation is memorized in the controller 32 after the power source switch has been turned off, the final water supply time Tw is set as the initial value. At step 104, the controller 32 is applied with a detection signal from the water level sensor 31a to determine whether the level of diluted brine in the first brine tank 21 is below the lower limit level or not. If the level of diluted brine in tank 21 is between the upper and lower limit levels, the controller 32 determines a "No" answer at step 104. When the level of diluted brine in tank 21 becomes the lower limit level due to supply of the diluted brine into the brine treatment device 10A, the controller 32 determines a "Yes" answer at step 104 and causes the program to proceed to step 106.

When the program proceeds to step 106, the controller 32 activates the electromagnetic water supply valve 23 to supply fresh water into the first brine tank 21 from the external supply source 10B of water through the water supply conduit P2. (see FIG. 4) At the following step 108, the controller 32 determines whether the water supply time data Tw is more than a predetermined maximum time value Tmax or not. In this embodiment, the maximum time value Tmax is determined to define a water supply time in a special condition where the level of diluted brine in tank 21 does not rise since the flow quantity of fresh water from the water supply source 10B is extremely small. Accordingly, the water supply time data Tw is set as a smaller value than the maximum time value Tmax at an initial stage in a normal condition. Thus, the controller 32 normally determines a "No" answer at step 108 and calculates the following equation (1) at step 110 to determine the operation frequency "n" of the hydraulic pump 25 within a time period defined by the water supply time data Tw.

$$n = \frac{a \cdot (C + L \cdot Tw)}{B \cdot \Delta V \cdot (A - a)} \quad (1)$$

In the equation (1), the values "a, C, L, ΔV, A, B" are represented as follows:

a(percent): concentration (a fixed value) of diluted brine in the first brine tank 21;

C(liter): an amount (a fixed value) of diluted brine required to rise the level of diluted brine in tank 21 from the lower limit level up to the upper limit level;

L(liter/minute): a flow quantity (a fixed value) of diluted brine supplied from the first brine tank 21 into the brine treatment device 10A in operation of the hydraulic pump;

ΔV(liter): a flow quantity (a fixed value) of saturated brine supplied from the second brine tank 24 into the first brine tank 21 in each operation of the hydraulic pump 25;

A(percent): concentration (a fixed value) of saturated brine in the second brine tank 24;

B: the specific gravity of saturated brine in the second brine tank 24.

The above equation (1) is obtained on a basis of the following equation (2) which satisfies a condition required for maintaining the concentration of diluted brine In tank 21 at the "a" percent when the level of diluted brine in tank 21 rises from the lower limit level up to the upper limit level by fresh water supplied from the external supply source 10B of water in a time period defined by the water supply time data Tw and saturated brine supplied from the second brine tank 24 at the operation frequency "n".

$$\frac{a}{100} = \frac{(A/100) \cdot B \cdot \Delta V \cdot n}{C + L \cdot Tw + B \cdot \Delta V \cdot n} \quad (2)$$

In the equation (2), the denominator "C+L Tw+B ΔV n" represents a total weight of diluted brine increased to rise the level of diluted brine in tank 21 from the lower limit level up to the upper limit level, and the numerator "(A/100) B ΔV n" represents the weight of increased salt.

After processing at step 110, the controller 32 calculates an operation interval data $T_2$ based on the following equation (3). (see FIG. 4)

$$T_2 = Tw/n \quad (3)$$

If the first brine tank 21 is supplied with fresh water from the external supply source 10B of water in the same condition as the previous condition, the calculated operation interval data $T_2$ represents an operation time interval of the hydraulic pump 25 required for maintaining the concentration of diluted brine in tank 21 at the "a" percent.

Subsequently, the controller 32 initializes at step 116 a time-count data $T_{3X}$ for measuring a water supply time of fresh water from the external supply source 10B of water into the first brine tank 21 and activates the hydraulic pump 25 at step 122 to supply saturated brine into the first brine tank 21 from the second brine tank 24 through the conduit P3. When the program proceeds to step 124 after processing at step 122, the controller 32 sets a flag FLG indicative of a condition of the hydraulic pump 25 as "1" indicative of operation of the hydraulic pump 25 and initializes a time-count data $T_{1x}$ for measuring an operation time of the hydraulic pump 25 and a time-count data $T_{2x}$ for measuring an operation interval of the hydraulic pump 25. (see FIG. 4)

Figure 3:
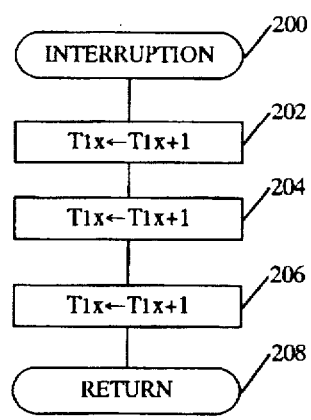
FIG. 3 is a flow chart of an interruption program executed by the controller at a predetermined time interval.

During execution of processing at step 104–138, the controller 32 executes an interruption program at step 200–208 shown in FIG. 3 at a predetermined short time interval. In this instance, the time-count data $T_{1x}$, $T_{2x}$, $T_{3x}$ initialized at step 116 and 124 are counted up by "1" upon each lapse of the predetermined short time by processing at step 202–206. After each execution of the interruption program, the controller 32 is applied with a detection signal from the water level sensor 31$b$ at step 132 to determine whether the level of diluted brine in tank 21 has risen up to the upper limit level or not. If the answer at step 132 is "No", the controller 32 determines a "No" answer at step 118 and causes the program to proceed to step 126. At step 126, the controller 32 determines whether the time-count data $T_{1x}$ is more than a predetermined value $T_{10}$ or not. In this embodiment; the predetermined value $T_{10}$ represents an operation time of the hydraulic pump 25 required for supplying the predetermined amount of saturated brine into the first brine tank 21 from the second brine tank 24. Accordingly, until the time-count data $T_{1x}$ becomes the predetermined value $T_{10}$, the controller 32 determines a "No" answer at step 126 and causes the program to proceed to step 132. At step 132, the controller 32 determines a "No" answer until the level of diluted brine in tank 21 rises up to the upper limit level and repeats processing at step 118, 126 and 132.

When the time-count data $T_{1x}$ becomes the predetermined value $T_{10}$ (see FIG. 4), the controller 32 determines a "Yes" answer at step 126 and deactivates the hydraulic pump 25 at step 128. That is to say, the hydraulic pump 25 is deactivated after the first brine tank 21 has been supplied with the predetermined amount $\Delta V$ of saturated brine from the second brine tank 24. When the program proceeds to step 130, the controller 32 sets the flag FLG as "0". If after processing at step 128 and 130, the level of diluted brine in tank 21 has not become the upper limit level, the controller 32 determines a "No" answer at step 132 and causes the program to proceed to step 118. At step 118, the controller 32 determines a "Yes" answer on a basis of the flag FLG set as "0" at step 130 and causes the program to proceed to step 120.

Figure 4:
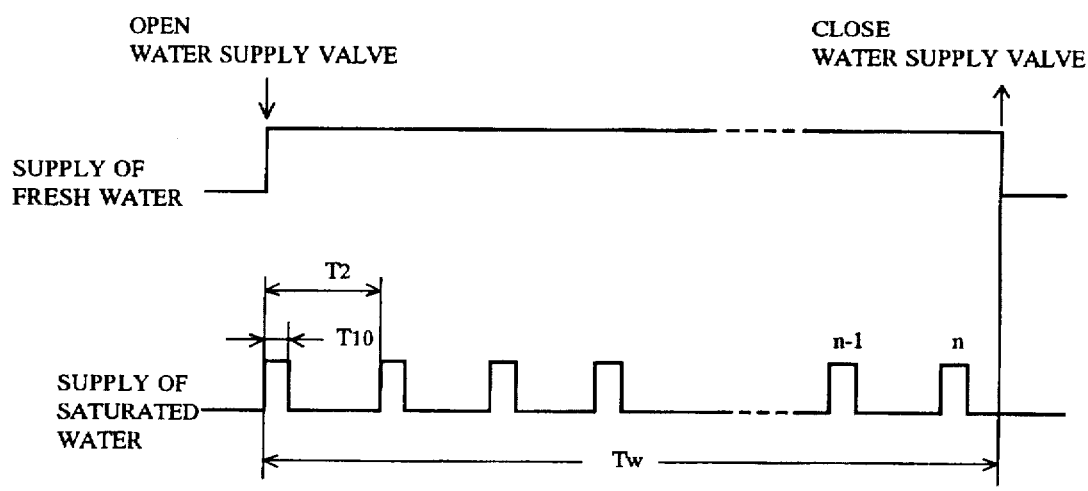
FIG. 4 is a time chart for explanation of operation of the brine supply system.

At step 120, the controller 32 determines whether or not the time-count data $T_{2x}$ is equal to or more than the operation interval data $T_2$ previously set at step 114. If the answer at step 120 is "No", the controller 32 repeats processing at step 118, 120 and 132. When the time-count data T2x becomes equal to or more than the operation interval data $T_2$ as shown in FIG. 4, the controller 32 determines a "Yes" answer at step 120 and causes the program to proceed to step 122. Thereafter, unless the level of diluted brine in tank 21 becomes the upper limit level, the controller 32 executes processing at step 118–132 to activate the hydraulic pump 25 for the predetermined time $T_{10}$ upon each lapse of the time period defined by the operation interval data $T_2$ thereby to supply the predetermined amount $\Delta V$ of saturated brine into the first brine tank 21 from the second brine tank 24.

When the level of diluted brine in tank 21 becomes the upper limit level, the controller 32 determines a "Yes" answer at step 132 and turns off the water supply valve 23 at step 134 to stop the supply of fresh water into the first brine tank 21. After processing at step 134, the controller 32 memorizes the time-count data $T_3$ as a water supply time Tw at step 136. In this instance, the water supply time Tw represents a time period required for supply of the fresh water at this time and is used for processing at step 114 at the next time. After processing at step 136, the controller 32 deactivates the hydraulic pump 25 at step 138 and sets the flag FLG as "0". The processing at step 138 is executed to deactivate the hydraulic pump 25 and make the flag FLG clear when the level of diluted brine in tank 21 has become the upper limit level during processing at step 118–132.

After processing at step 138, the program returns to step 104 where the controller 32 determines whether or not it has been detected by the water level sensor 31$a$ that the level of diluted brine in tank 21 dropped to the lower limit level. When the level of diluted brine in tank 21 has dropped to the lower limit level due to supply of the diluted brine into the electrolytic brine treatment device 10A, the controller 32 determines a "Yes" answer at step 104 and executes processing at the following step. Thus, until the level of diluted brine in tank 21 rises up to the upper limit level, the first brine tank 21 is supplied with fresh water from the external supply source 10B of water and supplied with the predetermined amount $\Delta V$ of saturated brine from the second brine tank 24 at the operation interval $T_2$.

If the amount of fresh water supplied from the external supply source 10B of water is small during execution of the control program, the level of diluted brine in tank 21 does not rise due to supply of the diluted brine into the brine treatment device 10A from the first brine tank 21. In such a case, the time-count data $T_{3x}$ becomes a large value during repetitive execution of processing at step 118–132, and the water supply time Tw is set as a large value at step 136. As a result, the controller 32 determines a "Yes" answer at step 108 and causes the program to proceed to step 112. At step 112, the controller 32 calculates the operation frequency "n" of hydraulic pump 25 within a time period defined by the water supply time Tw on a basis of the following equation (4).

$$n = \frac{a \cdot L \cdot Tw}{B \cdot \Delta V \cdot (A - a)} \tag{4}$$

Assuming that the supply amount "C+L Tw" of fresh water into the first brine tank 21 is equal to the supply amount "L Tw" of diluted brine into the brine treatment device 10A from the first brine tank 21, the amount of diluted brine to be increased in tank 21 becomes approximately zero. The calculated operation frequency "n" is used for calculation of the operation interval data $T_2$ at step 114, and the calculated operation interval data $T_2$ is used to control the operation interval of hydraulic pump 25 in the same manner as described above. Thus, the first brine tank 21 is supplied with saturated brine from the second brine tank 24 at the time interval defined by the operation interval data $T_2$.

As is understood from the above description, when the level of diluted brine in tank 21 drops to the lower limit level by processing at step 104, 106, 132, 134, the water supply valve 23 is operated to supply fresh water into the first brine tank 21 from the external supply source of water until the level of diluted brine in tank 21 becomes the upper limit level. The operation time of water supply valve 23 is measured and memorized by processing at step 116, 206, 136, and the operation interval T2 for maintaining the concentration of diluted brine in tank 21 at the predetermined value "a" (percent) is calculated on a basis of the previous operation time data Tw of water supply valve 23 by processing at step 110, 114. Thus, while the water supply valve 23 is being opened, the hydraulic pump 25 is activated at the operation interval T2 by processing at step 124, 204, 120, 122.

In this embodiment, the operation time data Tw is defined by the previous supply time of fresh water into the first brine tank 21. If the flow quantity of fresh water from the external supply source 10B of water is maintained in the same quantity, the operation interval T2 is calculated on a basis of the operation time data Tw to maintain the concentration of dilute brine in tank 21 at the predetermined value. Since the flow quantity of fresh water from the external supply source 10B of water does not change in a short time, the instant flow quantity of fresh water becomes approximately the same as the previous flow quantity of fresh water. Thus, the concentration of diluted brine in tank 21 is constantly maintained at the predetermined value.

Figure 5:
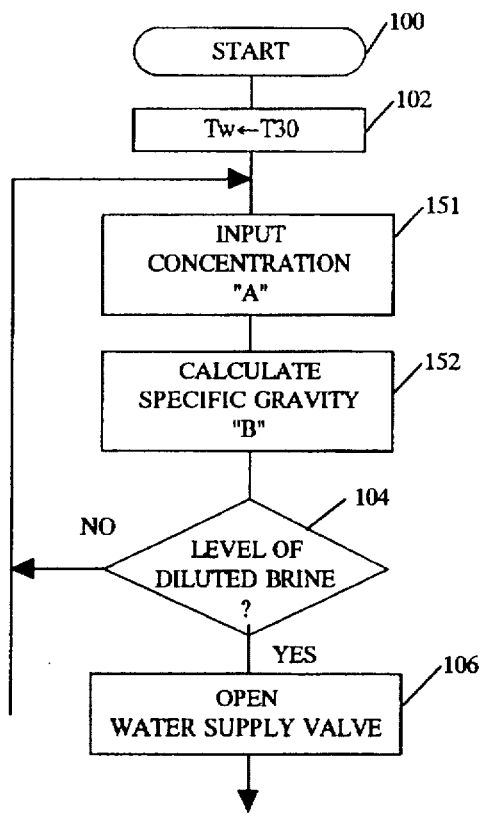
FIG. 5 is a flow chart of a modification of the control program.

Although in the above embodiment, a predetermined amount of saturated brine has been supplied into the second brine tank 24, an appropriate amount of saturated brine may be supplied into the second brine tank 24. In such a case, a concentration sensor 33 is provided within the second brine tank 24 as shown by dotted lines in FIG. 1 to measure the concentration A of saturated brine in tank 24. In addition, the control program is modified as shown In FIG. 5 wherein step 151 and 152 are added between step 102 and 104.

During execution of the modified program, the controller 32 is applied at step 151 with a detection signal indicative of concentration A of saturated brine in tank 24 from the concentration sensor 33 to calculate a specific gravity B of the saturated brine in tank 24. Based on the detected concentration A and the calculated specific gravity, the controller 32 calculates the operation frequency "n" of hydraulic pump 25 by processing at step 110 or 112 shown in FIG. 2 so that the concentration of saturated brine is maintained at the predetermined value.

Figure 2:
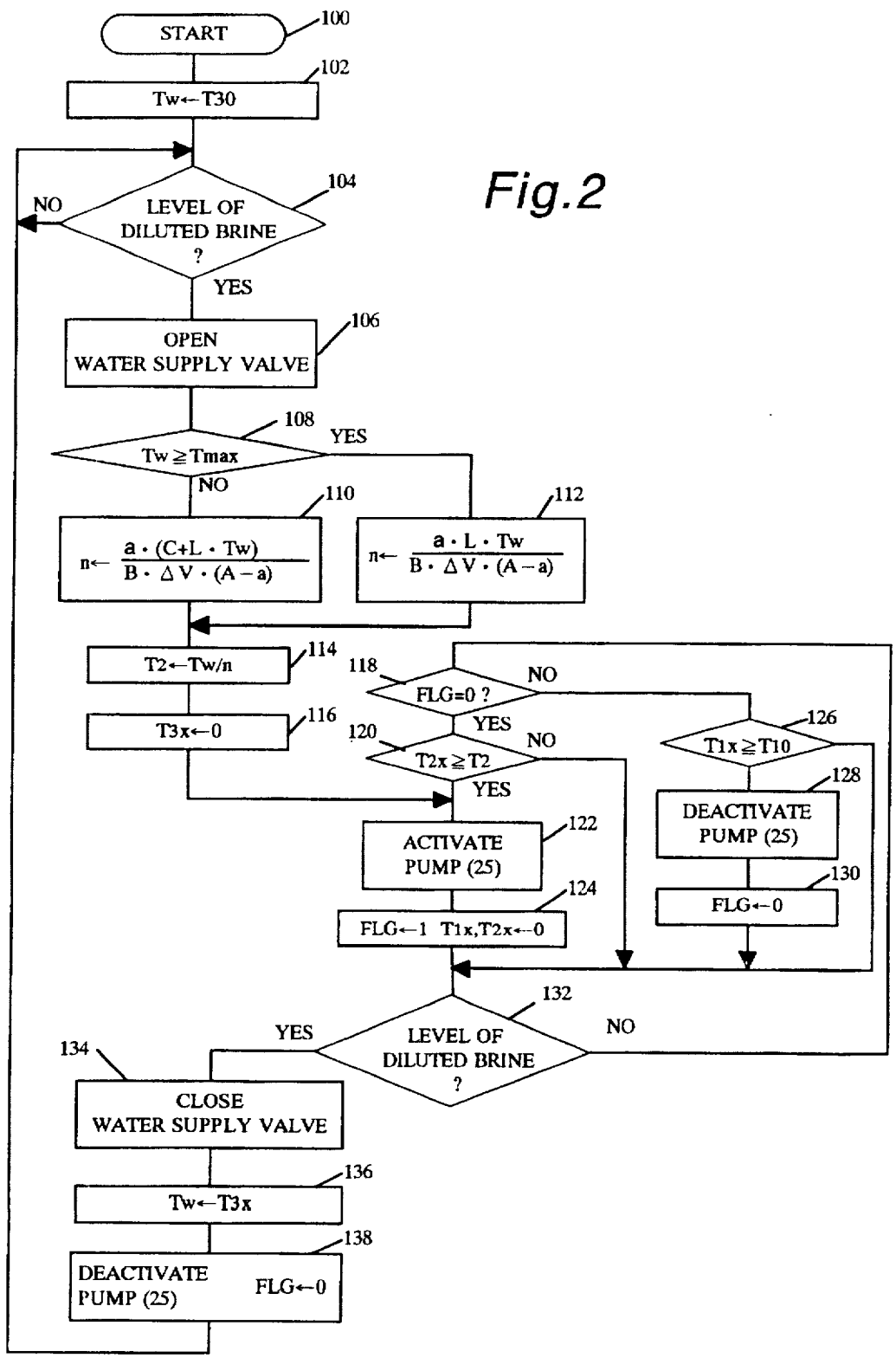
FIG. 2 is a flow chart of a control program executed by an electronic controller shown in FIG. 1.
Figure 6:
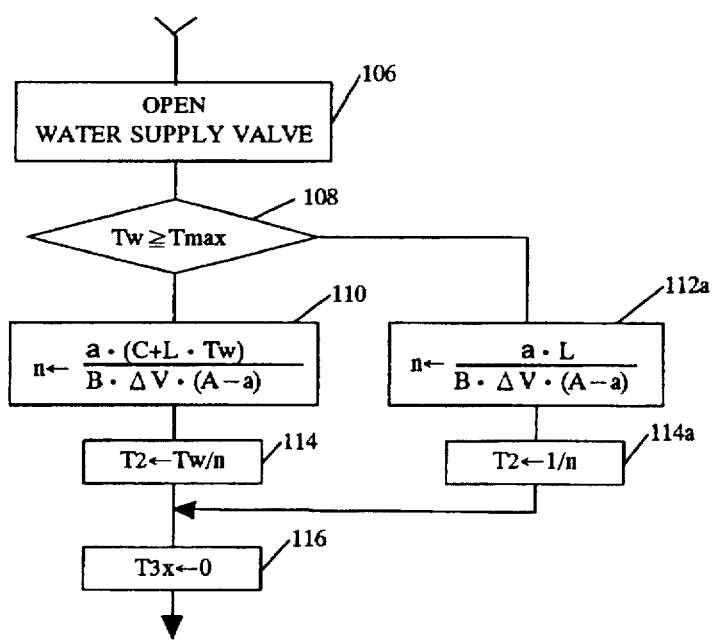
FIG. 6 is a flow chart of another modification of the control program.
Figure 3:
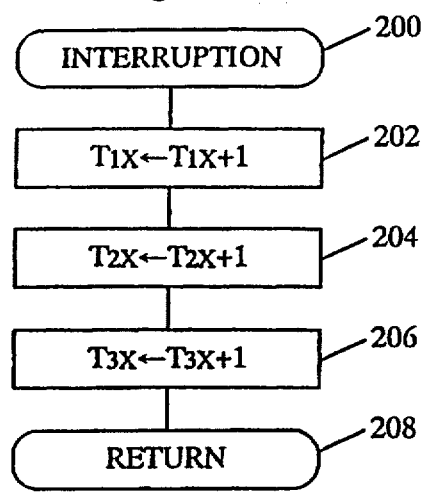

Although in the above embodiment, the controller 32 is programmed to calculate the operation frequency "n" of hydraulic pump 25 by processing at step 112 of FIG. 2 if the water supply time data Tw is more than the maximum time value Tmax and to calculate the operation interval T2 by processing at step 114, the processing at step 108–114 may be replaced with processing at step 108, 110, 112a, 114, 114a shown in FIG. 6. In such a case, the operation frequency "n" and operation interval T2 are calculated by processing at step 112a and 114a on a basis of the following equations (5) and (6).

$$n = \frac{a \cdot L}{B \cdot \Delta V \cdot (A - a)} \quad (5)$$

$$T_2 = 1/n \quad (6)$$

In a condition where the level of diluted brine in tank 21 does not rise up to the upper limit level for a long time, the flow quantity (per a unit time) of fresh water supplied into the first brine tank 21 from the external supply source of water is conditioned to be approximately equal to the flow quantity L (per a unit time) of diluted brine supplied into the brine treatment device 10A from the first brine tank 21. Therefore, the water supply data Tw in the equations (4) and (3) may be replaced with "1" Indicative of the unit time to obtain the above equations (5) and (6).

What is claimed is:

1. A brine supply system for supplying diluted brine of a predetermined concentration into a brine treatment device, comprising:

a first brine tank arranged to store an amount of the diluted brine;

first brine supply means for supplying a predetermined flow quantity of the diluted brine into said brine treatment device from said first brine tank for treatment operations;

water supply means for supplying fresh water into said first brine tank from an external supply source of water during said operations;

a second brine tank for storing an amount of saturated brine at a predetermined concentration;

second brine supply means for intermittently supplying a predetermined amount of the saturated brine into said first brine tank from said second brine tank during each operation; and an electric control apparatus for controlling said water supply means so as to maintain the amount of diluted brine in said first brine tank between upper and lower limit levels, wherein said electric control apparatus comprises:

a water level sensor for detecting the amount of the diluted brine in said first brine tank between the lower and upper limit levels;

first control means for operating said water supply means when said water level sensor detects a level of diluted brine at the lower limit level and for maintaining the operation of said water supply means to supply fresh water into said first brine tank from said external supply source of water until the level of diluted brine is detected at the upper limit level;

means for measuring an operation time of said water supply means, said measuring means including means for memorizing the measured operation time of each operation of said water supply means;

calculation means for calculating an operation time interval of said second brine supply means based on a previous operation time of said water supply means memorized in said memory means; and second control means for operating said second brine supply means at the calculated operation interval in response to operation of said water supply means whereby the amount of the diluted brine in said first brine tank is maintained at the predetermined concentration.

2. A brine supply system for supplying diluted brine of a predetermined concentration into a brine treatment device, comprising:

a first brine tank for storing an amount of the diluted brine;

first brine supply means for supplying a predetermined flow quantity of the diluted brine into said brine treatment device from said first brine tank for treatment operations;

water supply means for supplying fresh water into said first brine tank from an external supply source of water during said operations;

a second brine tank for storing an amount of saturated brine;

second brine supply means for intermittently supplying a predetermined amount of the saturated brine into said first brine tank from said second brine tank during each operation; and an electric control apparatus for controlling said water supply means so as to maintain the amount of diluted brine in said first brine tank between upper and lower limit levels, wherein said electric control apparatus comprises:

a water level sensor for detecting the amount of the diluted brine in said first brine tank between the lower and upper limit levels;

a concentration sensor for detecting concentration of the saturated brine in said second brine tank;

first control means for operating said water supply means when said water level sensor detects a level of diluted brine at the lower limit level and for maintaining the operation of said water supply means to supply fresh water into said first brine tank from said external supply source of water until the level of diluted brine is detected at the upper limit level;

means for measuring an operation time of said water supply means, said measuring means including means for memorizing the measured operation time of each operation of said water supply means;

calculation means for calculating an operation time interval of said second brine supply means based on a previous operation time of said water supply means memorized in said memory means and the concentration of the saturated brine detected by said concentration sensor; and second control means for operating said second brine supply means at the calculated operation interval in response to operation of said water supply means, whereby the diluted brine in said first brine tank is maintained at the predetermined concentration.

* * * * *

UNITED STATES PATENT AND TRADEMARK OFFICE
CERTIFICATE OF CORRECTION

PATENT NO.  : 5,792,343
DATED       : August 11, 1998
INVENTOR(S) : Fujita et al It is certified that error appears in the above-identified patent and that said Letters Patent is hereby corrected as shown below:

The Drawing, consisting of Fig. 3, should be deleted to be replaced with the Drawing Sheet, consisting of Fig. 3, as shown on the attached page.

Signed and Sealed this

Fourth Day of April, 2000

Attest:

Q. TODD DICKINSON

Attesting Officer

Director of Patents and Trademarks